United States Patent
Gogolla et al.

(10) Patent No.: US 7,199,866 B2
(45) Date of Patent: Apr. 3, 2007

(54) HANDHELD LASER DISTANCE MEASURING DEVICE WITH EXTREME VALUE MEASURING PROCESS

(75) Inventors: Torsten Gogolla, Schaan (LI); Dietmar Fritz Karl Kuhlmann, Au/SG (CH); Andreas Winter, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 486 days.

(21) Appl. No.: 10/715,713

(22) Filed: Nov. 18, 2003

(65) Prior Publication Data

US 2004/0114129 A1    Jun. 17, 2004

(30) Foreign Application Priority Data

Nov. 19, 2002    (DE) ................. 102 53 669

(51) Int. Cl.
*G01C 3/08* (2006.01)
(52) U.S. Cl. ............... 356/4.01; 356/4.02; 356/5.01; 356/5.02
(58) Field of Classification Search ............. 356/4.01
See application file for complete search history.

(56) References Cited

U.S. PATENT DOCUMENTS 6,587,184 B2 * 7/2003 Würsch et al. ............. 356/4.01
6,624,881 B2 * 9/2003 Waibel et al. ............. 356/4.01
6,903,810 B2 * 6/2005 Gogolla et al. ............. 356/3

FOREIGN PATENT DOCUMENTS

| DE | 19836812 | | 2/2000 |
| DE | 19836812 A1 | * | 2/2000 |
| JP | 08005370 | | 1/1996 |

* cited by examiner

*Primary Examiner*—Thomas H. Tarcza
*Assistant Examiner*—Luke D. Ratcliffe
(74) *Attorney, Agent, or Firm*—Abelman, Frayne & Schwab

(57) ABSTRACT

A handheld laser distance measuring device (1) and extreme value measurement process, including, in a first step, an input means (2) is actuated that triggers a measurement sequence, during which, in a second step, individual distance measurements are made triggered by the handheld laser distance device (1) and, in a third step, at least one minimum value (4) or one maximum value (5) relative to the measurement sequence is determined by the handheld laser distance measuring device using the individual measurements. An extreme value difference (6) relative to the measurement sequence is computed by the handheld laser distance measuring device (1) using at least one minimum value (5) and at least one maximum value (4).

8 Claims, 2 Drawing Sheets

HANDHELD LASER DISTANCE MEASURING DEVICE WITH EXTREME VALUE MEASURING PROCESS

BACKGROUND OF THE INVENTION

The invention relates to a handheld laser distance measuring device with an extreme value measuring process, in particular a laser distance measuring instrument for use on construction sites.

In the construction trade, precise determination of distance with a precision of several millimeters is required in the distance range of up to several 100 m. The handheld laser distance measuring devices designed for this purpose and to which this invention relates make use of a phase delay measurement method of a modulated visible laser beam for measuring distance.

Along with direct measurement of the distance from a reference point at which the handheld laser distance measuring device is positioned, more complex measuring tasks by combined individual measurements using simple mathematical algorithms are accomplished; for example, the measurement of rectangular area or a parallelepiped room volume. In particular in the building trade, measurement of the exact position of objects in the form of pipelines or reinforcements relative to surfaces in the form of walls or ceilings is an essential fundamental measurement task.

According to DE 1 983 6812 A1, a handheld laser distance measuring device is known having automatic determination of a minimum value or maximum value of a measurement sequence by virtue of slight fluctuations or the angularity of the handheld laser distance measuring device to different measurement points along a measurement path and its display or further processing in special functions or for determining the normal distance to a plane or the diagonal distance to a corner. Measurement of the position of objects relative to surfaces is possible only indirectly by virtue of known algorithms worked out manually by the user using the results of a plurality of individual measurements, in particular by specific subtraction of two measurement results relative to different measurement points.

SUMMARY OF THE INVENTION

The object of the invention is to provide a handheld laser distance measuring device using an extreme value measurement process that directly supports another basic measuring task.

This object is achieved by an extreme value measuring process of a handheld laser measuring device wherein an input means is actuated, in a first step, said means triggering the measuring sequence, during which, in a second step, individual measurements of distances are made triggered by the handheld laser distance measuring device and, in a third step, at least one maximum value or minimum value relative to the measurement sequence is determined by the handheld laser distance measuring device from the individual measurements, whereby an extreme value difference relative to the measurement sequence is calculated by the distance measuring device from at least one minimum value and at least maximal value.

Through the automatic calculation of the extreme value difference, which is displayed and/or further processed, further basic measurement tasks can be directly accomplished by the handheld laser distance measuring device.

Advantageously, in a third step, after the calculation by the handheld laser distance measuring device, the measurement sequence is expanded and continued from the second step, wherein the momentary minimum value, the momentary maximum value and the momentary extreme value difference are again periodically recalculated.

Advantageously, in a second step, during the performance of the measurement sequence individual measurements of the distances to a plurality of different measurement points along a measurement path is done by the handheld laser distance measuring device.

In the second step, in an appropriate utilization of the handheld laser distance measuring device associated with the basic measuring task in the construction trade, the measurement path covers at least, in part, one surface and an object situated in front of this surface is at least in part covered. The measurement of the relative position of the objects to the surfaces, the distance of a reinforcement in front of a ceiling is done directly. The necessary measurement path can be established both by slight pivoting of the angular position of the hand with the handheld laser measuring device or by a parallel shift of the handheld laser distance measuring device along the path by moving on a reference surface or through a combination of these operations.

Advantageously, in a further step, the computed extreme value difference is displayed directly on a display device with the minimum value and the maximum value.

Advantageously, in a further step, the extreme value difference is used as a parameter of a further basic measurement task for determining an extreme of a number of extreme value differences.

Advantageously, in a third step, using an analysis of the individual measurements, a plausibility test is performed whether the individual measurements are distributed within two sufficiently discrete, limited distance ranges, wherein trends deviating from the standard surface and resulting in measurement errors are identified and acknowledged using the output of an error message or associated error tolerance range.

A handheld laser distance measuring device, supporting this further basic measurement task has an input means for activating the extreme value measurement process for joint determination of both the minimum value and the maximum value of the distance of a measurement sequence, whereby the user does not need to undertake any further actions.

Advantageously, the display means has a direct display of the extreme value difference, whereby it can be read off directly.

BRIEF DESCRIPTION OF THE DRAWINGS

The exemplary embodiment of the invention will be more completely described with reference to the drawings, wherein.

DETAILED DESCRIPTION OF THE INVENTION

Figure 1:
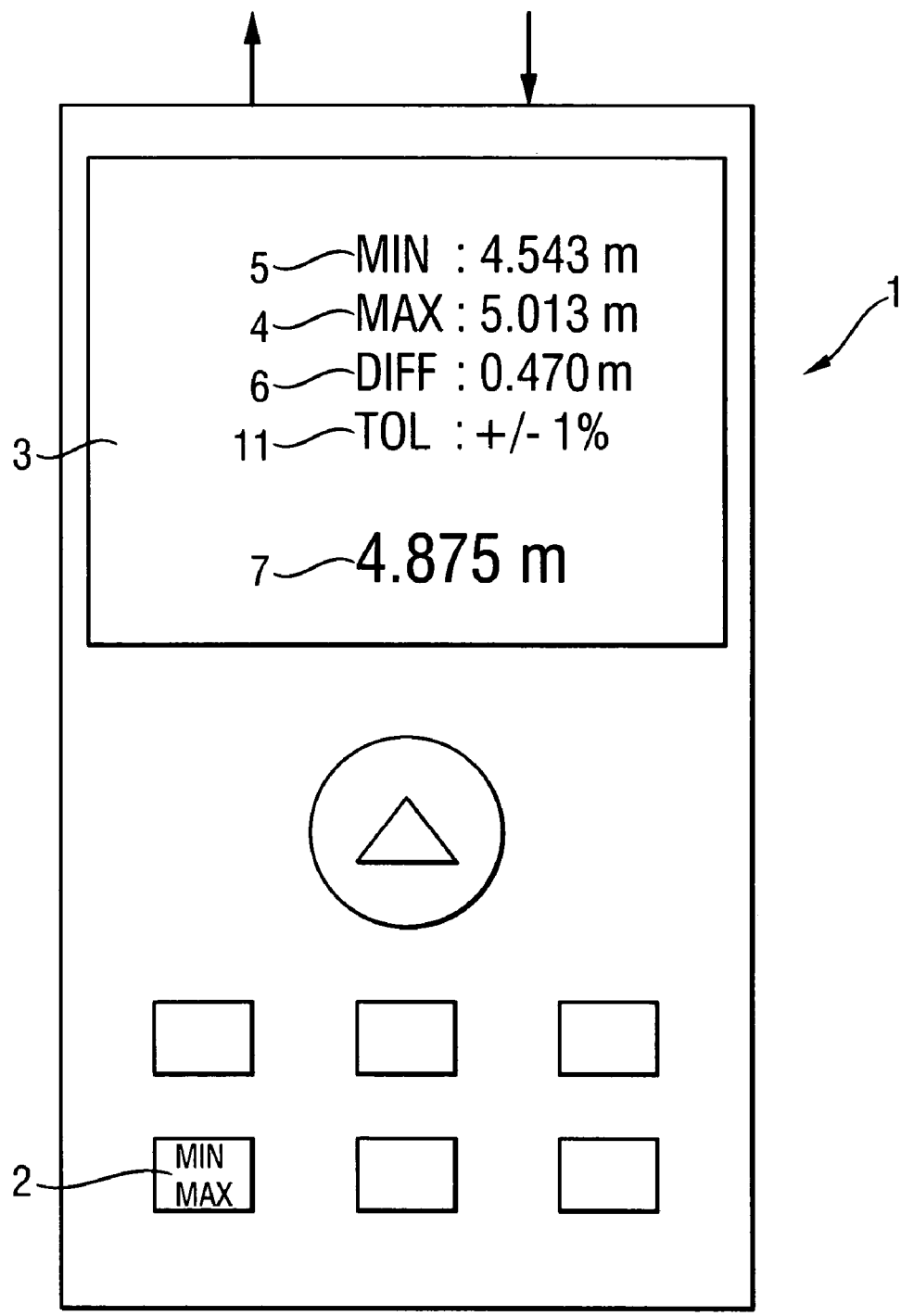
FIG. 1 shows a handheld laser distance measuring device according to the invention.

FIG. 1 shows a handheld laser distance measuring device 1 having the additional function and which is automatically executed by an integrated microcontroller. This additional function is activated using an input means 2 in the form of a measurement sequence Min/Max key. The handheld laser distance measuring device 1 then switches to continuous measuring mode, in which ongoing distance measurements with a high measurement rate are executed. The maximum value 4 of the minimum value 5 and the extreme value difference 6 between the maximum value 4 and the minimum value 5 are displayed while this measurement mode is active. The lower large display represents the current individual measured distance 7. In this example, the distance to the room ceiling (maximum value) is 5.013 m. The distance to the pipe (minimum value) is 0.47 m. The actual measured distance 7 is 4.875 m. The operator is notified via the display means 3 of an error tolerance 11 in the event of error.

Figure 2:
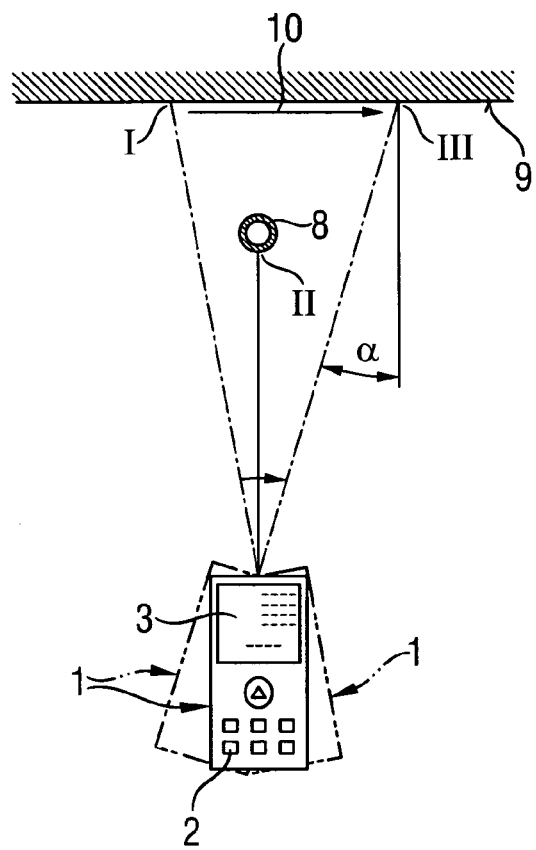
FIG. 2. shows a basic measurement task according to the invention.
Figure 3:
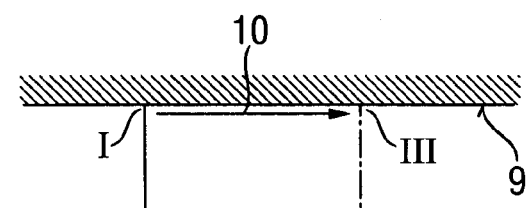
FIG. 3 shows an alternative to the basic measurement task according to the invention.
Figure 3:
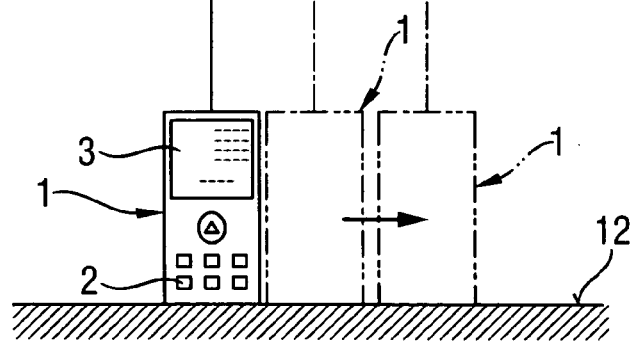

The basic measurement task is shown in FIGS. 2 and 3. If, for example, the operator would like to measure the distance of an object 8 in a pipe relative to a surface 9 behind a room ceiling, he can simply and without precise aiming move the laser measuring spot of the handheld laser distance measuring device with the additional function in Min/Max activated mode along a measurement path 10 over the pipe from Position I over Position II to Position III. When this is done, he can tilt the handheld laser distance measuring device 1 as shown in FIG. 2, in the hand around a reference point or, as shown in FIG. 3, move it linearly along a reference surface 12. In tilting, a small angle of tilt $\alpha$ must be respected to keep measurement errors to a minimum. The software of the handheld laser measuring device 1 can control whether there is a small angle of tilt $\alpha$ through an analysis of the many individual measurement values.

What is claimed is:

1. An extreme value measuring process of a handheld laser distance measuring device (1), wherein, in a first step, an input means (2) is actuated that triggers a measurement sequence, during which, in a second step, individual measurements of distances to a plurality of different measurement points along a measurement path (10) are made triggered by the handheld laser distance measuring device (1) and, in a third step, one of at least one maximum value (4) and one minimum value (5) relative to the measurement sequence is determined by the handheld laser distance measuring device (1) from the individual measurements, wherein an extreme value difference (6) relative to the measurement sequence is automatically calculated by the handheld laser distance measuring devices using at least one minimum value (5) and at least one maximum value (4);

wherein, in the second step, the measurement path (10) covers at least in part a surface (9) and an object (8) arranged in front of said surface (9); and wherein, in a further step, the computed extreme value difference (6) is displayed directly on a display means (4).

2. The extreme value measurement process of claim 1, wherein, in the third step, after computation by the handheld laser distance device the measurement sequence is expanded and continued with the second step.

3. The extreme value measurement process of claim 1, wherein, in yet a further step, the extreme value difference (6) is used as a parameter of a further basic measuring task.

4. An extreme value measuring process of a handheld laser distance measuring device (1), wherein, in a first step, an input means (2) is actuated that triggers a measurement sequence, during which, in a second step, individual measurements of distances to a plurality of different measurement points along a measurement path (10) are made triggered by the handheld laser distance measuring device (1) and, in a third step, one of at least one maximum value (4) and one minimum value (5) relative to the measurement sequence is determined by the handheld laser distance measuring device (1) from the individual measurements, wherein an extreme value difference (6) relative to the measurement sequence is calculated by the handheld laser distance measuring devices using at least one minimum value (5) and at least one maximum value (4);

wherein, in the second step, the measurement path (10) covers at least in part a surface (9) and an object (8) arranged in front of said surface (9);

wherein, in a further step, the computed extreme value difference (6) is displayed directly on a display means (4);

wherein, in yet a further step, the extreme value difference (6) is used as a parameter of a further basic measuring task; and wherein, in the third step, a plausibility test is done using an analysis of the individual measurements.

5. The extreme value measurement process of claim 4, wherein depending on the plausibility test on a display means (3) one of a message and an error tolerance (11) on a display means (3) is displayed.

6. A handheld laser distance measuring device for carrying out the extreme value measurement process of claim 1, comprising an input means (2) for activating an extreme value measurement process for joint determination of both a minimum value (5) and a maximum value (4) of the distance of a measurement sequence.

7. The hand held laser distance measuring device of claim 6, wherein the display means (3) provides a direct display of the extreme value difference (6).

8. The handheld laser distance measuring device of claim 6, wherein the display means (3) provides a direct display of the minimum value (5) and the maximum value (4).

* * * * *